(12) United States Patent  
Guzik

(10) Patent No.: US 7,141,969 B2
(45) Date of Patent: Nov. 28, 2006

(54) X-Y SPINSTAND PLATFORM WITH FLEXURE-COUPLED PLATEN

(75) Inventor: Nahum Guzik, Palo Alto, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 132 days.

(21) Appl. No.: 10/811,680

(22) Filed: Mar. 29, 2004

(65) Prior Publication Data

US 2005/0212516 A1   Sep. 29, 2005

(51) Int. Cl.
*G01R 33/00* (2006.01)
*G01R 33/12* (2006.01)
*G01G 11/00* (2006.01)

(52) U.S. Cl. .................. 324/261; 324/212; 74/490.09; 108/20

(58) Field of Classification Search ............... 324/210, 324/212, 260, 262, 261; 360/77.08, 214, 360/75, 76, 290, 290.1–5, 214.4, 294.1–294.5; 369/13.2; 74/16, 490.09, 490.13; 248/657, 248/661; 108/20, 138, 143

See application file for complete search history.

(56) References Cited

U.S. PATENT DOCUMENTS

| | | | | |
|---|---|---|---|---|
| 5,040,431 A | * | 8/1991 | Sakino et al. ............. | 74/490.09 |
| 5,114,302 A | * | 5/1992 | Meisser et al. .......... | 414/751.1 |
| 5,505,104 A | * | 4/1996 | Takei ....................... | 74/490.09 |
| 5,589,771 A | * | 12/1996 | Chur ......................... | 324/212 |
| 6,006,614 A | * | 12/1999 | Guzik et al. .............. | 73/865.6 |
| 6,140,815 A | | 10/2000 | Greene et al. | |
| 6,212,045 B1 | * | 4/2001 | Guzik ...................... | 360/255.2 |
| 6,363,809 B1 | * | 4/2002 | Novak et al. ............ | 74/490.09 |
| 6,483,300 B1 | * | 11/2002 | Severson et al. .......... | 324/212 |
| 6,531,867 B1 | | 3/2003 | Greene et al. | |
| 6,646,436 B1 | * | 11/2003 | Mihara et al. .............. | 324/212 |
| 2003/0002198 A1 | * | 1/2003 | Subrahamanyan et al. ..................... | 360/77.02 |
| 2003/0094058 A1 | * | 5/2003 | Kito ........................ | 74/490.09 |

OTHER PUBLICATIONS

IBM Research: Basic Description of Banded Sector Servo; http://domino.research.ibm.com/Comm/bios.nsf/pages/sector.html; Mar. 24, 2004; 4 pages.

Dave Anderson, et al., More than an Interface—SCSI vs. ATA, Seagate Technology, Mar. 2003, 13 pp.

Fujitsu, Hard Drive MPG3xxxAT Series, 3.5-inch ATA 5400, RPM Disk Drives, 2 pages.

\* cited by examiner

*Primary Examiner*—Edward Lefkowitz
*Assistant Examiner*—Kenneth J. Whittington
(74) *Attorney, Agent, or Firm*—Mark G. Lappin; Foley & Lardner LLP

(57) ABSTRACT

An XY platen positioning system includes a fixed base rigidly coupled to a essentially planar surface. An XY intermediate plate is slidably coupled to the fixed base, such that the XY intermediate plate is slidable in the X axis along the fixed base. An XY stage is slidably coupled to the XY intermediate plate, such that the XY stage is slidable in the Y axis along the XY intermediate plate. A platen is flexibly coupled to the XY stage, such that the platen, with respect to the XY stage, is essentially constrained in the X and Y axes and moveable in the Z axis.

25 Claims, 6 Drawing Sheets

X-Y SPINSTAND PLATFORM WITH FLEXURE-COUPLED PLATEN

FIELD OF THE INVENTION

This invention relates to spinstands and, more particularly, to spinstands for use in testing read-write head assemblies of hard disk drives.

BACKGROUND

The storage capacity of hard drives is continuously increasing due to advancements in the accuracy and sensitivity of the magnetic read-write head assemblies incorporated into these hard drives. Due to the ever increasing levels of accuracy and sensitivity, the read-write head assemblies are increasingly difficult to manufacture, resulting in a large portion of the read-write head assemblies being tested prior to being installed in hard disk drives.

When testing a read-write head assembly, it is typically placed onto a testing system, commonly referred to as a spinstand. The spinstand typically incorporates a slide brake assembly that duplicates the movement of the read-write head assembly as if it were installed in a hard disk drive. This slide brake assembly, which is typically positionable at a low level of resolution, includes a micropositioning stand that is typically positionable at a high level of resolution.

The data tracks in a hard disk drive are concentric tracks on the surfaces of the platters of the hard disk drive, and the density of these tracks is continuously increasing (i.e., currently hard disk drives have track densities as high as 50,000–100,000 tracks per inch (tpi)).

As these densities continue to increase, the positional resolution of the slide brake assembly must increase accordingly. For example, for a hard disk drive having a density of 50,000 tpi, in order to adequately test a read-write head assembly for use in such a hard disk drive, the positional resolution of the slide brake assembly (and, therefore, the read-write head assembly) should typically be $1/100^{th}$ of the track width. Accordingly, the combination of the slide brake assembly and the micropositioning stand should have a positional resolution of 0.0000002 inches. This high level of positional resolution is typically achieved through the use of a micropositioning stand that includes a piezoelectric crystal that expands and contracts based on the voltage signal applied to the crystal. Accordingly, during typical testing, the slide brake assembly is used to generally position the read-write head assembly and then the micropositioning stand accurately locates the read-write head assembly above or below the appropriate hard disk drive track.

During a typical testing sequence, the read-write head assembly to be tested is mounted to the micropositioning stand. A spindle-mounted magnetic disk is then spun at the operating speed of the target hard drive (i.e., typically between 5,400 and 20,000 rpm). The slide brake assembly generally positions the read-write head assembly proximate the test position of the rotating magnetic disk and the micropositioning stand then accurately positions the read-write head assembly. Once accurately positioned, the read-write head assembly is commanded through a series of data read-write operations to verify accuracy and sensitivity of the read-write head assembly.

As would be expected, in addition to being able to accurately position the read-write head assembly, the rate at which the read-write head assembly is repositioned must also be quite high. For example, it is desirable to be able to move the read-write head assembly from a first test position to a second test position within one disk revolution. For a disk rotating at 20,000 rpm, that is equal to three milliseconds.

In order to facilitate such quick repositioning, current spinstand designs typically include slide brake assemblies that are coarsely positioned using rail assemblies and air bearings, finely positioned using piezoelectric crystals, and clamped down to a granite surface using vacuum-evacuated platens. Unfortunately, the use of multiple air bearings often reduce overall accuracy and complicates the manufacturing process.

SUMMARY OF INVENTION

According to a first implementation of the invention, an XY platen positioning system includes a fixed base rigidly coupled to a essentially planar surface. An XY intermediate plate is slidably coupled to the fixed base, such that the XY intermediate plate is slidable in the X axis along the fixed base. An XY stage is slidably coupled to the XY intermediate plate, such that the XY stage is slidable in the Y axis along the XY intermediate plate. A platen is flexibly coupled to the XY stage, such that the platen, with respect to the XY stage, is essentially constrained in the X and Y axes and moveable in the Z axis.

One or more of the following features may also be included. An X axis locking device may stabilize the XY intermediate plate with respect to the fixed base by temporarily coupling the XY intermediate plate to the fixed base. The X axis locking device may include an actuator that contacts a portion of the fixed base.

A Y axis locking device may stabilize the XY stage with respect to the XY intermediate plate by temporarily coupling the XY stage to the XY intermediate plate. The Y axis locking device may include an actuator that contacts a portion of the XY stage.

One or more flexures may flexibly attach the XY stage and the platen. A preloading device may be positioned between the XY stage and the platen, such that the preloading device stabilizes the platen, with respect to the XY stage, by reducing the risk of Y axis compressive buckling of the one or more flexures.

The XY platen positioning system may include a micropositioning stand, such that the micropositioning stand is configured to accept a read-write head assembly. The micropositioning stand may include a piezoelectric crystal for micropositioning the read-write head assembly.

One or more bearing assemblies may slidably attach the XY intermediate plate to the fixed base. An X axis linear actuator may control the X axis movement of the XY intermediate plate with respect to the fixed base.

One or more bearing assemblies may slidably attach the XY stage to the XY intermediate plate. A Y axis linear actuator may control the Y axis movement of the XY stage with respect to the XY intermediate plate.

According to a further implementation of the invention, a spinstand platform includes a vacuum-preloaded air bearing platen for supporting a micropositioning stand, such that the platen is constrained for three-dimensional motion above an essentially planar surface. The micropositioning stand is adapted to support a read-write head assembly. At least one actuator moves the platen to a desired XY location above the essentially planar surface. An apparatus removes air from the platen to move the platen along the Z axis and lock down the platen to the essentially planar surface at the desired location.

According to a further implementation of the invention, a spinstand platform includes an air bearing platen for supporting a micropositioning stand, such that the platen is constrained for three-dimensional motion above an essentially planar surface. The micropositioning stand is adapted to support a read-write head assembly. A slide brake assembly moves the platen to a desired XY location above the essentially planar surface. An apparatus removes air from the platen to move the platen along the Z axis and lock down the platen to the essentially planar surface at the desired location.

One or more of the following features may also be included. The slide brake assembly may include: a fixed base rigidly coupled to the essentially planar surface; an XY intermediate plate slidably coupled to the fixed base, such that the XY intermediate plate is slidable in the X axis along the fixed base; and an XY stage slidably coupled to the XY intermediate plate, such that the XY stage is slidable in the Y axis along the XY intermediate plate and the platen is flexibly coupled to the XY stage.

The platform may include an X axis locking device for stabilizing the XY intermediate plate with respect to the fixed base by temporarily coupling the XY intermediate plate to the fixed base. The X axis locking device may include an actuator that contacts a portion of the fixed base.

The platform may include a Y axis locking device for stabilizing the XY stage with respect to the XY intermediate plate by temporarily coupling the XY stage to the XY intermediate plate. The Y axis locking device may include an actuator that contacts a portion of the XY stage.

One or more flexures may flexibly attach the XY stage and the platen. A preloading device may be positioned between the XY stage and the platen, such that the preloading device stabilizes the platen, with respect to the XY stage, by reducing the risk of Y axis compressive buckling of the flexures.

The spinstand platform may include a micropositioning stand, and the micropositioning stand may be configured to accept a read-write head assembly. The micropositioning stand may include a piezoelectric crystal for micropositioning the read-write head assembly.

One or more bearing assemblies may slidably attach the XY intermediate plate to the fixed base. An X axis linear actuator may control the X axis movement of the XY intermediate plate with respect to the fixed base. One or more bearing assemblies may slidably attach the XY stage to the XY intermediate plate. A Y axis linear actuator may control the Y axis movement of the XY stage with respect to the XY intermediate plate.

The slide brake assembly may include a fixed base rigidly coupled to the essentially planar surface. An XY intermediate plate may be slidably coupled to the fixed base, such that the XY intermediate plate is slidable in the Y axis along the fixed base. A platen may be slidably and flexibly coupled to the XY intermediate plate, such that the platen is slidable in the X axis along the XY intermediate plate, and the platen is moveable in the direction of the Z axis with respect to the XY intermediate plate.

A Y axis locking device may stabilize the XY intermediate plate with respect to the fixed base by temporarily coupling the XY intermediate plate to the fixed base. The Y axis locking device may include an actuator that contacts a portion of the fixed base.

An X axis locking device may stabilize the platen with respect to the XY intermediate plate by temporarily coupling the platen to the XY intermediate plate. The X axis locking device may include an actuator that contacts a portion of the XY intermediate plate.

One or more flexures may flexibly attach the XY intermediate plate and the platen. The platform may include a micropositioning stand, which may be configured to accept a read-write head assembly. The micropositioning stand may include a piezoelectric crystal for micropositioning the read-write head assembly.

One or more bearing assemblies may slidably attach the XY intermediate plate to the fixed base. A Y axis linear actuator may control the Y axis movement of the XY intermediate plate with respect to the fixed base.

One or more bearing assemblies may slidably attach the platen to the XY intermediate plate. An X axis linear actuator may control the X axis movement of the platen with respect to the XY intermediate plate.

According to a further implementation of the invention, a spinstand platform includes an air bearing platen for supporting a micropositioning stand. The platen is constrained for three-dimensional motion above an essentially planar surface. The micropositioning stand is adapted to support a read-write head assembly. At least one actuator moves the platen to a desired XY location above the essentially planar surface. A vacuum preloading apparatus removes air from the platen to stabilize the platen along the Z axis and maintain the platen a defined Z axis distance above the essentially planar surface.

According to a further implementation of the invention, a spinstand platform includes an air bearing platen for supporting a micropositioning stand. The platen is constrained for three-dimensional motion above an essentially planar surface. The micropositioning stand is adapted to support a read-write head assembly. A slide brake assembly moves the platen to a desired XY location above the essentially planar surface. A vacuum preloading apparatus removes air from the platen to stabilize the platen along the Z axis and maintain the platen a defined Z axis distance above the essentially planar surface.

One or more of the following features may also be included. The slide brake assembly may include: a fixed base rigidly coupled to the essentially planar surface; an XY intermediate plate slidably coupled to the fixed base, such that the XY intermediate plate is slidable in the X axis along the fixed base; and an XY stage slidably coupled to the XY intermediate plate, such that the XY stage is slidable in the Y axis along the XY intermediate plate and the platen is flexibly coupled to the XY stage. One or more flexures may flexibly attach the XY stage and the platen. A preloading device may be positioned between the XY stage and the platen, such that the preloading device stabilizes the platen, with respect to the XY stage, by reducing the risk of Y axis compressive buckling of the one or more flexures.

The slide brake assembly may include a fixed base rigidly coupled to the essentially planar surface. An XY intermediate plate may be slidably coupled to the fixed base, such that the XY intermediate plate is slidable in the Y axis along the fixed base. A platen may be slidably and flexibly coupled to the XY intermediate plate, such that the platen is slidable in the X axis along the XY intermediate plate, and the platen is moveable in the direction of the Z axis with respect to the XY intermediate plate. One or more flexures may flexibly attach the XY intermediate plate and the platen.

According to a further implementation of the invention, a system for positioning a platen with respect to a coordinate system having an X axis, a Y axis, and a Z axis, the X, Y, and Z axes being orthogonal, includes a fixed base rigidly coupled to the essentially planar surface. An XY intermediate plate is slidably coupled to the fixed base, such that the XY intermediate plate is slidable in the Y axis along the fixed base. A platen is slidably and flexibly coupled to the XY intermediate plate, such that the platen is slidable in the X axis along the XY intermediate plate, and the platen is moveable in the direction of the Z axis with respect to the XY intermediate plate.

One or more of the following features may also be included. A Y axis locking device may stabilize the XY intermediate plate with respect to the fixed base by temporarily coupling the XY intermediate plate to the fixed base. The Y axis locking device may include an actuator that contacts a portion of the fixed base.

An X axis locking device may stabilize the platen with respect to the XY intermediate plate by temporarily coupling the platen to the XY intermediate plate. The X axis locking device may include an actuator that contacts a portion of the XY intermediate plate.

One or more flexures may flexibly attach the XY intermediate plate and the platen. The platform may include a micropositioning stand, which may be configured to accept a read-write head assembly. The micropositioning stand may include a piezoelectric crystal for micropositioning the read-write head assembly.

One or more bearing assemblies may slidably attach the XY intermediate plate to the fixed base. A Y axis linear actuator may control the Y axis movement of the XY intermediate plate with respect to the fixed base.

One or more bearing assemblies may slidably attach the platen to the XY intermediate plate. An X axis linear actuator may control the X axis movement of the platen with respect to the XY intermediate plate.

It is an object of this invention to provide an improved spinstand that includes a platen that is constrained concerning X and Y axes motion, yet allowed to move freely in the Z axis.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
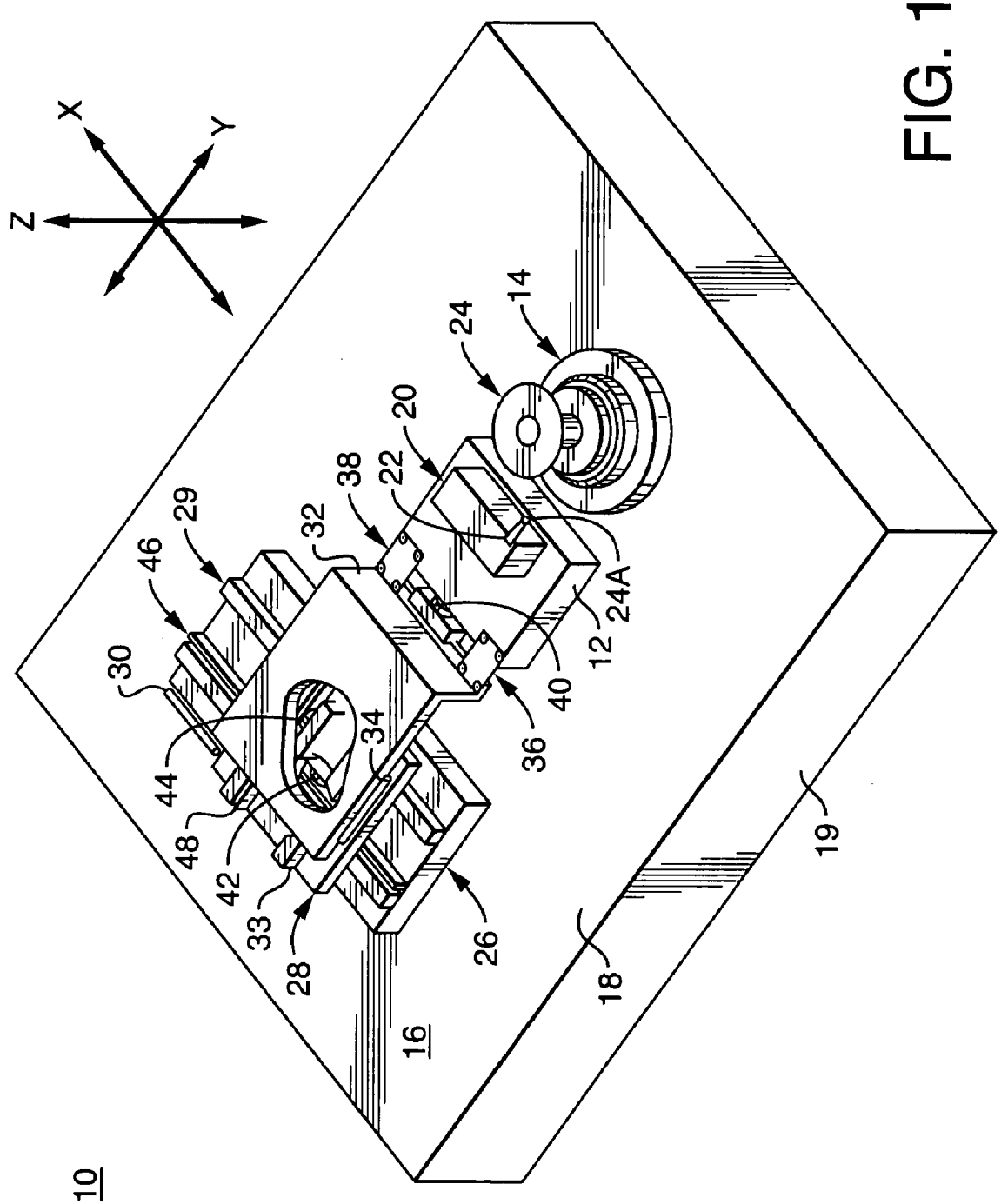
FIG. 1 is an isometric view of an improved spinstand platform.

A spinstand platform 10 is shown in FIG. 1 with respect to an X-Y-Z coordinate system. The spinstand 10 includes an air bearing platen 12 and an air bearing spindle 14. Platform 10 includes a slide brake assembly 16 that allows for the positioning of platen 12 above a planar surface 18 of a base 19. Typically, base 19 is a slab of granite, providing an inherently dimensionally stabile and vibration-absorbing mass.

Platen 12 (which will be discussed below in greater detail) includes a micropositioning stand 20 positioned thereon and configured to receive a read-write head assembly 22 (including a read-write head 24A), which is to be tested prior to being installed in a hard drive.

As explained above, during a testing procedure, a spindle-mounted magnetic disk 24 is placed on air bearing spindle 14 and spun at the operating speed (i.e., typically between 5,400 and 20,000 rpm) of the hard drive into which read-write head assembly 22 is to be placed. The slide brake assembly 16 generally positions the read-write head assembly 22 (and the read-write head 24A) proximate a desired test position over (or under) the rotating magnetic disk 24 and the micropositioning stand 20 then effects fine motion control to precisely position the read-write head assembly 22 (and the read-write head 24A) above or below the appropriate track on magnetic disk 24. As is known in the art, micropositioning stand 20 typically includes a piezoelectric crystal that expands and contracts based on the voltage signal applied to the crystal in order to effect the highly accurate positioning of the read-write head 24A of assembly 22 with respect to the desired track on disk 24. Once accurately positioned, read-write head 24A of read-write head assembly 22 is commanded to perform a series of data read-write operations to verify the performance of read-write head assembly 22.

Slide brake assembly 16 includes a fixed base 26 that is rigidly coupled to planar surface 18. An XY intermediate plate 28 is slidably coupled to fixed base 26 so that XY intermediate plate 28 is allowed to slide (with respect to fixed base 26) in the direction of (i.e., along) the X axis. Typically, one or more bearing assemblies (not shown) slidably couple the XY intermediate plate 28 and the fixed base 26 via one or more X axis bearing rails (e.g., rail 29). An X axis linear actuator 30 (e.g., a standing wave motor manufactured by Nanomotion Ltd. of Yokneam, Israel) controls the X axis movement of the XY intermediate plate 28 with respect to the fixed base 26.

Slide brake assembly 16 also includes an XY stage 32 that is slidably coupled to XY intermediate plate 28 so that XY stage 32 is allowed to slide (with respect to XY intermediate plate 28) in the direction of (i.e., along) the Y axis. Again, one or more bearing assemblies (not shown) slidably couple the XY stage 32 and the XY intermediate plate 28 via one or more Y axis bearing rails (e.g., rail 33). A Y axis linear actuator 34 (e.g., a standing wave motor manufactured by Nanomotion Ltd. of Yokneam, Israel) controls the Y axis movement of the XY stage 32 with respect to the XY intermediate plate 28.

Platen 12 is flexibly attached to XY stage 32 via one or more flexures 36, 38 that are constructed of a flexible material (e.g., aluminum or steel) and are rigidly connected at a first end to the XY stage 32 and at a second end to platen 12. Essentially, flexures 36, 38 allow platen 12 to move in the Z axis while inhibiting relative motion in the X and Y axes.

In the embodiment shown in FIG. 1, flexures 36, 38 are strip-like elements that have substantial breadth along the X axis (relative to their length along the Y axis). This enhances the stability of the moveable platen principally by reducing the extent of torsional twisting of platen 12 with respect to XY stage 32. Typically, flexures 36, 38 effectively inhibit bidirectional motion along the X axis and monodirectional motion along the Y axis (e.g., when under tension such as when pulling platen 12).

Additionally, in order to reduce the risk of Y axis compressive flexure buckling when pushing platen 12, a preloading device 40 (e.g., a solenoid-type or pneumatic-type actuator) stabilizes platen 12 (with respect to XY stage 32) by providing a non-compressible Y axis coupling between platen 12 and XY stage 32. For example, preloading device 40 may be mounted to XY stage 32 and extended to contact platen 12 or preloading device 40 may be mounted on platen 12 and extended to contact XY stage 32. While preloading device 40 provides for a non-compressible coupling between XY stage 32 and platen 12, preloading device 40 does not interfere with Z axis motion between XY stage 32 and platen 12.

During operating of platform 10, air bearing platen 12 is maintained at a defined Z axis distance (e.g., two-hundred-fifty micro-inches) above planar surface 18, thus allowing for the functionless movement of platen 12 over surface 18. This defined Z axis distance is maintained by balancing pressurized air (i.e., having a positive pressure with respect to atmospheric pressure, e.g., +10 psi) and vacuum (i.e., having a negative pressure with respect to atmospheric pressure, e.g., −2 psi) are applied to the gap between planar surface 18 and platen 12. Generally, as in the illustrated embodiment, the vacuum is used to preload the bearing. In other embodiments, other preloading methods may be used, such as gravity bases, magnetic bases, or a combination of all three types.

It is desirable to minimize the amount of time required to position and stabilize platen 12. Accordingly, actuators 30, 34 provide for rapid acceleration and deceleration of platen 12, and slide brake assembly 16 includes an X axis locking device 42 and a Y axis locking device 44 that stabilize the platen in the X and Y axes respectively. Typically, locking devices 42 and 44 are only applied after the cessation of X axis and Y axis motion.

During testing, once XY intermediate plate 28 is positioned along the X axis, X axis locking device 42 (which is typically attached to XY intermediate plate 28 and includes an actuator; not shown) contacts X axis locking rail 46 (incorporated into fixed base 26), resulting in the stabilization of XY intermediate plate 28 with respect to fixed base 26.

Similarly, when XY stage 32 is positioned along the Y axis, Y axis locking device 44 (which is typically attached to XY stage 32 and includes an actuator; not shown) contacts Y axis locking rail 48 (incorporated into XY stage 32), resulting in the stabilization of XY stage 32 with respect to XY intermediate plate 28.

Figure 2:
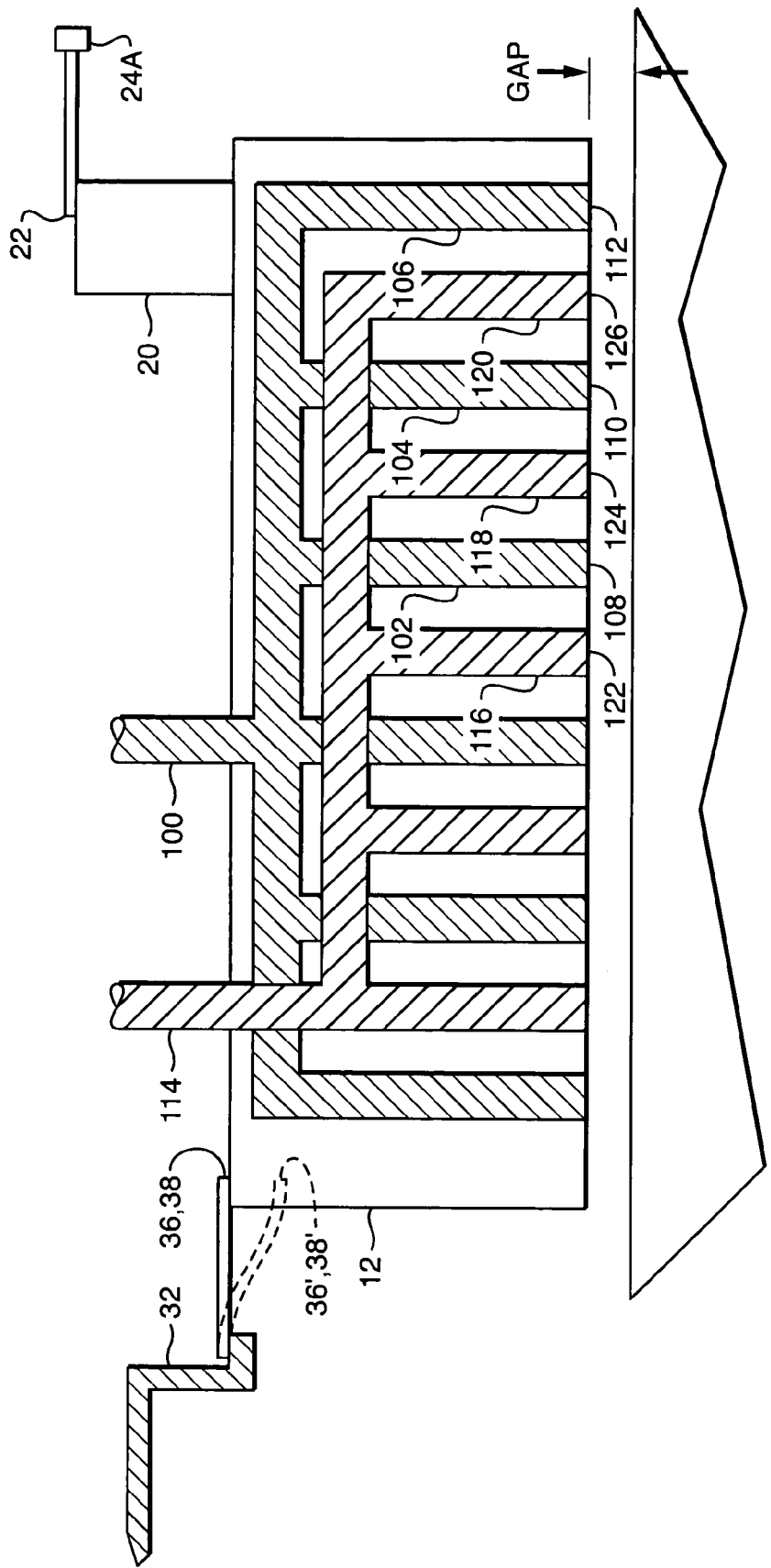
FIG. 2 is a cross-sectional view of the platen of the improved spinstand platform of FIG. 1.

Referring also to FIG. 2, there is shown a cross-sectional view of air bearing platen 12 in which a pressurized air supply line 100 provides pressurized air that is distributed to the lower surface of platen 12 via a plurality of pressure passages 102, 104, 106 and discharge nozzles 108, 110, 112, such that the gap size (i.e., the defined Z axis distance) increases as the pressure of the pressurized air increases is increased.

Additionally, a vacuum preload may be applied via vacuum line 114, a plurality of vacuum passages 116, 118, 120 and a plurality of vacuum ports 122, 124, 126. With this configuration, if a vacuum is applied and pressurized air is not supplied, air between the lower surface of platen 12 and surface 18 is removed (effecting a relatively low pressure in that region). This low pressure causes platen 12 to clamp down onto planar surface 18, resulting in the gap (i.e., the Z axis distance) being reduced to zero.

FIG. 2 is merely an illustrative representation of one embodiment of platen 12 and is not intended to illustrate each and every element of platen 12.

Continuing with the above-described testing procedure, while platen 12 is being coarsely positioned by slide brake assembly 16, pressurized air is applied (via supply line 100) to the gap to maintain the desired Z axis distance. Additionally, a vacuum may be applied (via vacuum line 114) to maintain the appropriate level of preload (i.e., downward force to counter the upward force generated by the pressurized air), to stabilize the gap at a desired thickness and provide a desired stiffness along the Z axis. Alternatively, this downward force may be achieved magnetically (i.e., through the use of a ferromagnetic planar surface and a magnetized platen) or gravitationally (i.e., by adjusting the weight of platen 12).

In one preferred form of the invention, once platen 12 is accurately positioned, platen 12 is clamped to surface 18. This clamping can be effected by decreasing the positive pressure of the pressurized air while maintaining the vacuum constant; or by increasing the negative pressure of the vacuum while maintaining the positive pressure of the pressurized air constant; or by a combination of both. For example, when "floating", the positive pressure can be 10 psi and the negative pressure can be −2 psi; and when "clamping", the positive pressure can be 10 psi and the negative pressure can be −10 psi.

This clamping is effected by reducing the positive pressure supplied by supply line 100, increasing the level of vacuum applied via vacuum line 114, or a combination of both. Since platen 12 is flexibly connected to XY stage 32, flexures 36, 38 deflect (as shown in phantom flexures 36', 38'), thus allowing the vacuum applied to platen 12 to remove the air from the gap and draw platen 12 down. This, in turn, reduces the gap to zero and facilitates the accurate and stable testing of read-write head assembly 22.

Once the testing procedure is completed, the vacuum can be removed or the pressurized air reapplied, thus restoring the gap between platen 12 and surface 18 and allowing for the repositioning of platen 12.

Figure 3:
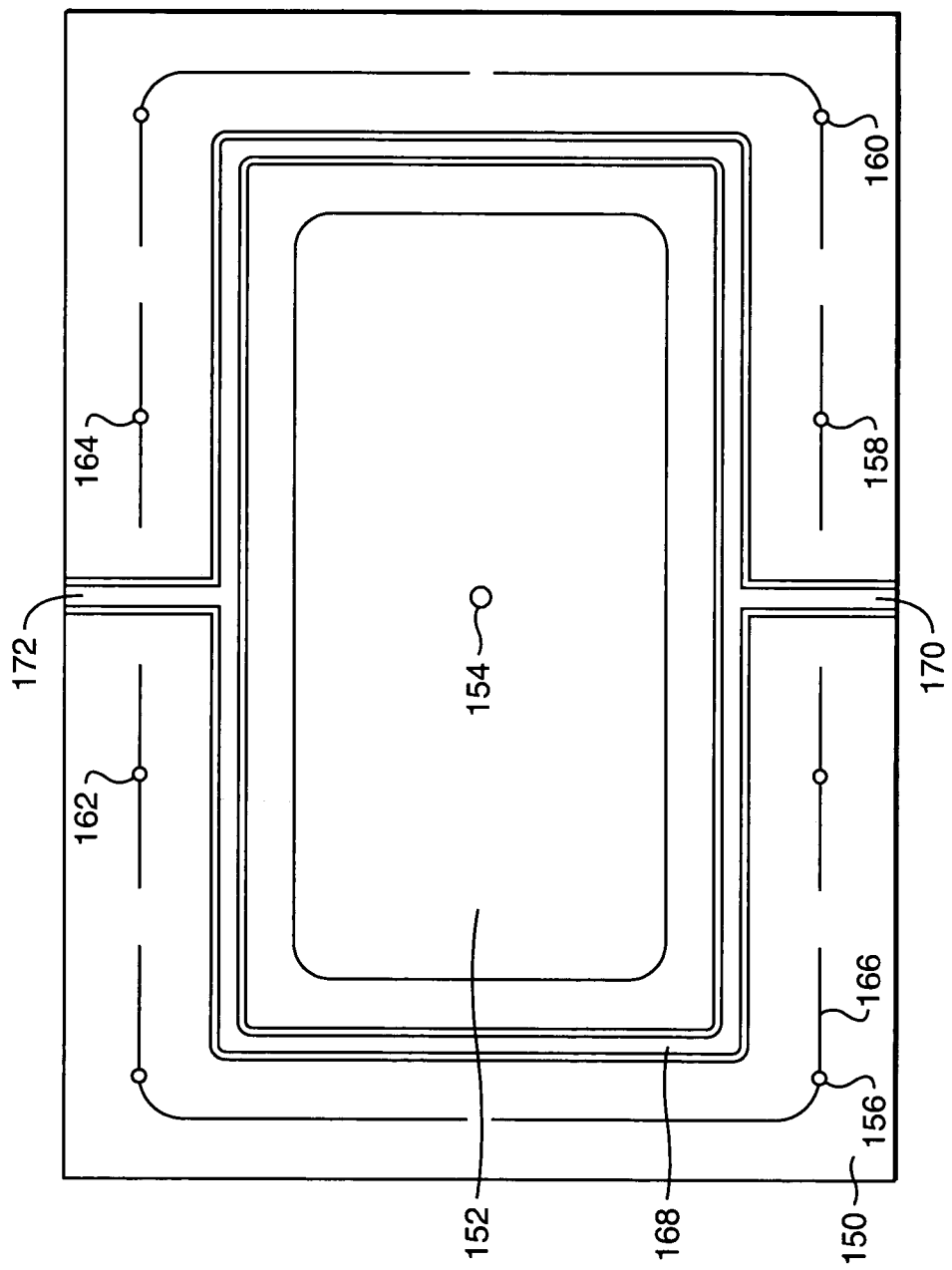
FIG. 3 is a schematic view of a lower surface of an alternative embodiment platen of the improved spinstand platform of FIG. 1.

Referring to FIG. 3, a lower surface 150 of an alternative embodiment platen 12' is shown. The lower surface 150 of platen 12' includes a centralized vacuum recess 152 that is evacuated by vacuum port 154. Vacuum port 154 is attached to a vacuum line (not shown). Distributed around the periphery of platen 12' are one or more pressurized air supply ports, e.g., ports 156, 158, 160, 162, 164. Each of these ports is coupled to a pressurized air supply line (not shown). Typically, an air distribution channel 166 (i.e., a channel machined into the lower surface 150 of platen 12') allows for the distribution of pressurized air across the lower surface 150 of platen 12'. Additionally, positioned between vacuum recess 152 and pressurized air supply ports 156, 158, 160, 162, 164 is an atmospheric pressure equalization channel 168 that surrounds vacuum recess 152 and is coupled to atmospheric pressure via channels 170, 172 about the periphery of the lower surface 150 of platen 12'.

Figure 4:
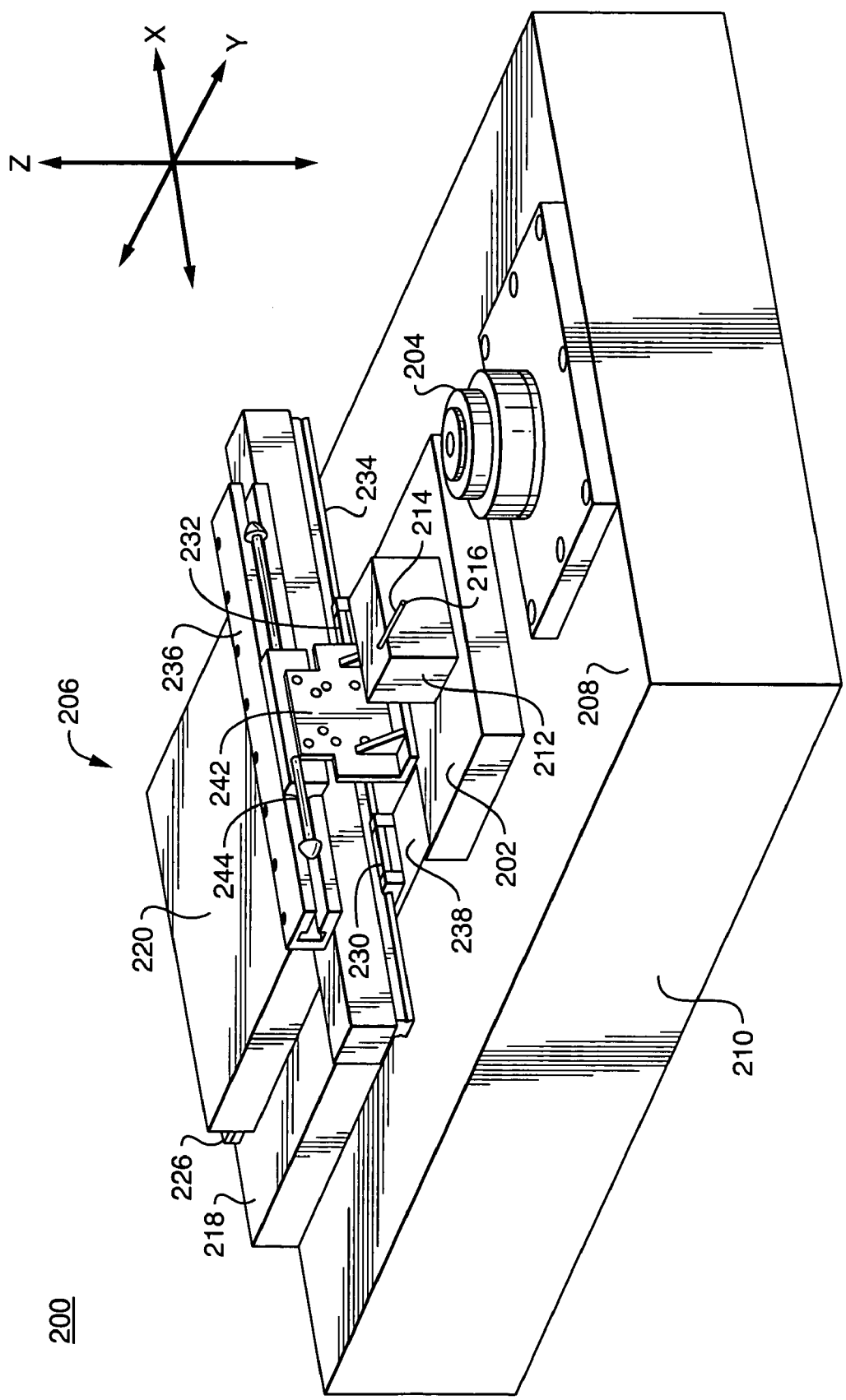
FIG. 4 is an isometric view of an alternative embodiment of the improved spinstand platform.
Figure 5:
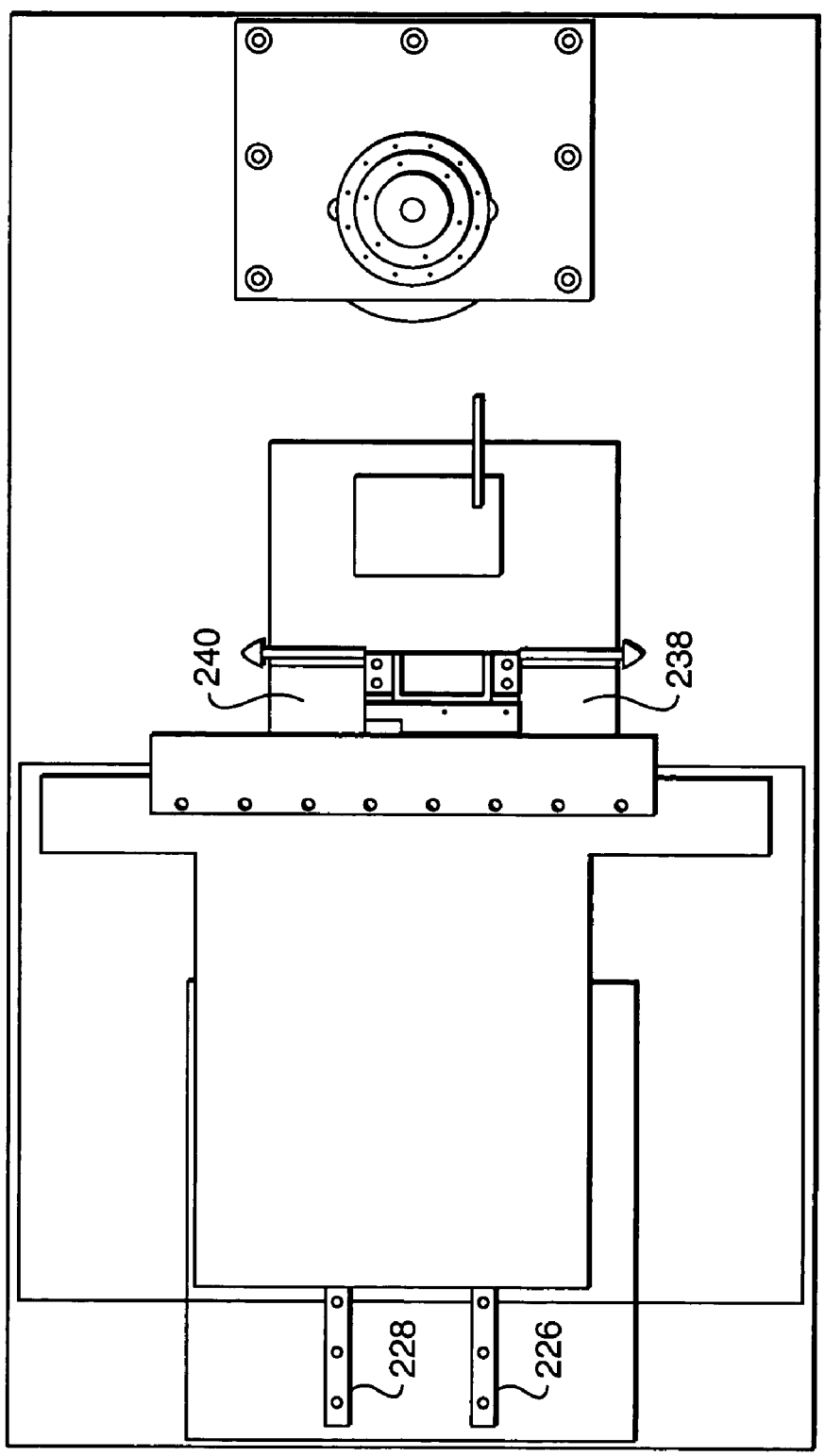
FIG. 5 is a top view of the improved spinstand platform of FIG. 4.
Figure 6:
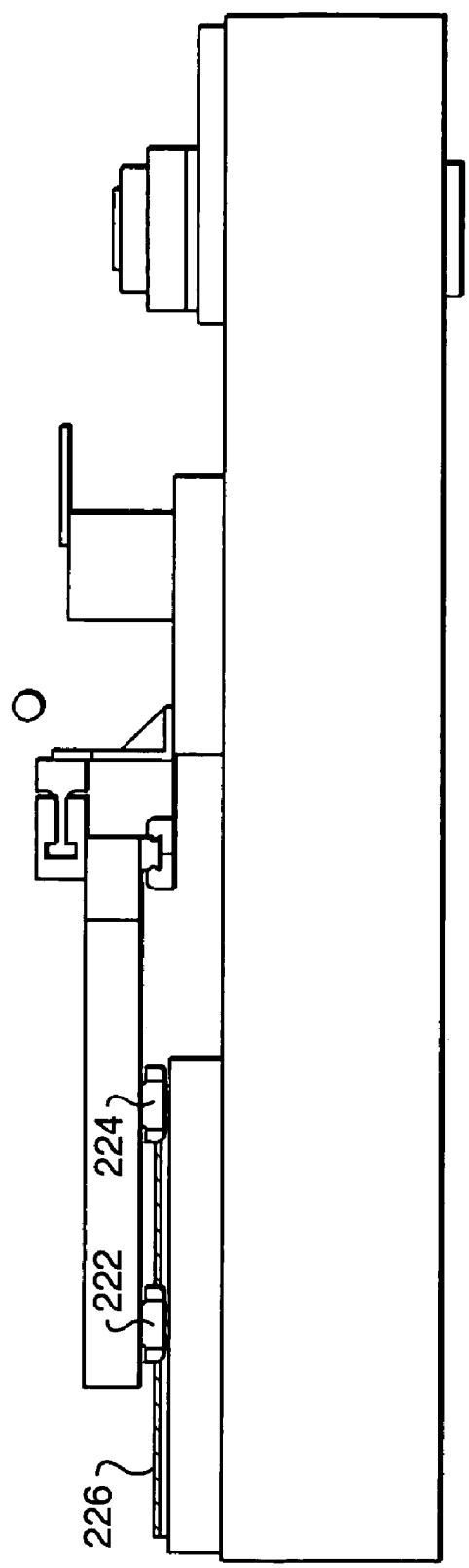
FIG. 6 is a side view of the improved spinstand platform of FIG. 4.

Referring to FIGS. 4–6, an alternative embodiment spinstand platform 200 is shown with respect to an X-Y-Z coordinate system. FIG. 4 represents an isometric view of spinstand platform 200; FIG. 5 represents a top view of spinstand platform 200; and FIG. 6 represents a side view of spinstand platform 200.

Spinstand platform 200 includes an air bearing platen 202 and an air bearing spindle 204. Platform 200 includes a slide brake assembly 206 that allows for the positioning of platen 202 above a planar surface 208 of a base 210. Typically, base 210 is a slab of granite.

Platen 202 includes a micropositioning stand 212 positioned thereon and configured to receive a read-write head assembly 214 (including a read-write head 216), which is to be tested prior to being installed in a hard drive.

Slide brake assembly 206 includes a fixed base 218 that is rigidly coupled to planar surface 208. An XY intermediate plate 220 is slidably coupled to fixed base 218 so that XY intermediate plate 220 is allowed to slide (with respect to fixed base 218) in the direction of (i.e., along) the Y axis. Typically, one or more bearing assemblies 222, 224 slidably couple the XY intermediate plate 220 and the fixed base 218 via one or more Y axis bearing rails 226, 228. An Y axis linear actuator (not shown) controls the Y axis movement of the XY intermediate plate 220 with respect to the fixed base 218.

Platen 202 is slidably coupled to XY intermediate plate 220 so that platen 202 is allowed to slide (with respect to XY intermediate plate 220) in the direction of (i.e., along) the X axis. Again, one or more bearing assemblies 230, 232 slidably couple platen 202 and XY intermediate plate 220 via one or more X axis bearing rails (e.g., rail 234).

An X axis linear actuator 236 controls the X axis movement of the platen 202 with respect to XY intermediate plate 220.

Platen 202 is flexibly attached to XY intermediate plate 220 via one or more flexures 238, 240 that are constructed of a flexible material (e.g., aluminum or steel) and are rigidly connected at a first end to bearing assemblies 230, 232 (which are slidably attached to XY intermediate plate 220 via rail 234) and at a second end to platen 202. As in the earlier described embodiment, flexures 238, 240 allow platen 202 to move in the Z axis while inhibiting motion in the X and Y axes.

In the embodiment shown in FIGS. 4–6, flexures 238, 240 are strip-like elements that have substantial breadth along the X axis (relative to their length along the Y axis). Typically, flexures 238, 240 effectively inhibit bidirectional motion along the X axis and monodirectional motion along the Y axis (e.g., when under tension such as when pulling platen 202).

Platen 202 typically includes bracket assembly 242 coupled to a slidable assembly 244 moveable within linear actuator 236. According, by applying a controlled current to linear actuator 236, slidable assembly 244 may be positioned at the appropriate X axis position along the length of linear actuator 236 which, in turn, positions platen 202 at the appropriate X axis position. Additionally, slidable assembly 244 is configured to move freely (with respect to linear actuator 236) along the Z axis. When configuring linear actuator 244, the extent of this Z axis movement is sized so that the movement is substantial enough to allow platen 202 to be locked down onto surface 208. Further, in order to allow for accurate Y axis positioning of platen 202, linear actuator 244 should be configured so that Y axis play (i.e., Y axis movement of slidable assembly 244 with respect to linear actuator 236) is minimized.

During operating of platform 200, platen 202 is maintained at a defined Z axis distance (e.g., two-hundred-fifty micro-inches) above planar surface 208, thus allowing for the frictionless movement of platen 202 over surface 18. This defined Z axis distance is maintained by balancing the rates at which pressurized air and vacuum are applied to the gap between planar surface 208 and platen 202. As discussed above, vacuum is generally used to preload platen 202. In other embodiments, other preloading methods may be used, such as gravity bases, magnetic bases, or a combination of all three types.

As with the embodiment shown in FIG. 1, it is desirable to minimize the amount of time required to position and stabilize platen 202. The Y axis actuator (not shown) and X axis actuator 236 provide for rapid acceleration and deceleration of platen 202. Further, slide brake assembly 200 includes an X axis and a Y axis locking device (not shown) for stabilizing platen 202 in the X and Y axes respectively. Typically, the X axis and Y axis locking devices are only applied after the cessation of X axis and Y axis motion.

Once properly positioned, platen 202 is typically clamped down to surface 208 (as discussed above). This, in turn, reduces the gap between platen 202 and surface 208 to zero, thus facilitating the accurate and stable testing of read-write head assembly 214.

While the system is described above as including two flexures 36, 38 or 238, 240, other configurations are possible. For example, a single flexure may be used. Alternatively, three or more flexures may be used.

While the system is described above as being configured to position the platen in accordance with an X-Y positioning scheme, other configurations are possible. For example, the slide brake assembly may be configured to allow for polar coordinate positioning (not shown) in that the slide brake may be designed to include an extendable arm that pivots about a fixed point. Accordingly, once the arm is rotated to the desired angular position, the arm may be extended to the appropriate radius, thus accurately positioning the read-write head assembly.

A number of implementations have been described. Nevertheless, it will be understood that various modifications may be made. Accordingly, other implementations are within the scope of the following claims.

What is claimed is:

1. A system for positioning a platen with respect to a coordinate system having an X axis, a Y axis, and a Z axis, said X, Y, and Z axes being orthogonal, the system comprising:
   a fixed base rigidly coupled to an essentially planar surface; an XY intermediate plate slidably coupled to the fixed base, wherein the XY intermediate plate is slidable in the X axis along the fixed base;
   an XY stage slidably coupled to the XY intermediate plate, wherein the XY stage is slidable in the Y axis along the XY intermediate plate; and
   a platen flexibly coupled to the XY stage, one or more flexure elements for flexibly attaching the XY stage and the platen;
   wherein the platen, with respect to the XY stage, is essentially constrained in the direction of the X and Y axes and moveable in the direction of the Z axis.

2. The system of claim 1 further comprising: an X axis locking device for stabilizing the XY intermediate plate with respect to the fixed base by temporarily coupling the XY intermediate plate to the fixed base.

3. The system of claim 2 wherein the X axis locking device includes an actuator that contacts a portion of the fixed base.

4. The system of claim 1 further comprising: a Y axis locking device for stabilizing the XY stage with respect to the XY intermediate plate by temporarily coupling the XY stage to the XY intermediate plate.

5. The system of claim 4 wherein the Y axis locking device includes an actuator that contacts a portion of the XY stage.

6. The system of claim 1 further comprising: a preloading device positioned between the XY stage and the platen, wherein the preloading device stabilizes the platen, with respect to the XY stage, by reducing the risk of Y axis compressive buckling of the one or more flexures.

7. The system of claim 6 further comprising: a micropositioning stand.

8. The system of claim 7 wherein the micropositioning stand is configured to accept a read-write head assembly.

9. The system of claim 8 wherein the micropositioning stand includes a piezoelectric crystal for micropositioning the read-write head assembly.

10. The system of claim 1 further comprising: one or more bearing assemblies for slidably attaching the XY intermediate plate to the fixed base.

11. The system of claim 10 further comprising: an X axis linear actuator for controlling the X axis movement of the XY intermediate plate with respect to the fixed base.

12. The system of claim 1 further comprising: one or more bearing assemblies for slidably attaching the XY stage to the XY intermediate plate.

13. The system of claim 12 further comprising: a Y axis linear actuator for controlling the Y axis movement of the XY stage with respect to the XY intermediate plate.

14. A system for positioning a platen with respect to a coordinate system having an X axis, a Y axis, and a Z axis, said X, Y, and Z axes being orthogonal, the system comprising:
a fixed base rigidly coupled to an essentially planar surface;
an XY intermediate plate slidably coupled to the fixed base, wherein the XY intermediate plate is slidable in the Y axis along the fixed base; and
a platen slidably and flexibly coupled to the XY intermediate plate,
one or more flexure elements for flexibly attaching the XY stage and the platen:
wherein the platen is slidable in the X axis along the XY intermediate plate, and wherein the platen is moveable in the direction of the Z axis with respect to the XY intermediate plate.

15. The system of claim 14 further comprising: a Y axis locking device for stabilizing the XY intermediate plate with respect to the fixed base by temporarily coupling the XY intermediate plate to the fixed base.

16. The system of claim 15 wherein the Y axis locking device includes an actuator that contacts a portion of the fixed base.

17. The system of claim 14 further comprising: an X axis locking device for stabilizing the platen with respect to the XY intermediate plate by temporarily coupling the platen to the XY intermediate plate.

18. The system of claim 17 wherein the X axis locking device includes an actuator that contacts a portion of the XY intermediate plate.

19. The system of claim 14 further comprising: a micropositioning stand.

20. The system of claim 19 wherein the micropositioning stand is configured to accept a read-write head assembly.

21. The system of claim 20 wherein the micropositioning stand includes a piezoelectric crystal for micropositioning the read-write head assembly.

22. The system of claim 14 further comprising: one or more bearing assemblies for slidably attaching the XY intermediate plate to the fixed base.

23. The system of claim 22 further comprising: a Y axis linear actuator for controlling the Y axis movement of the XY intermediate plate with respect to the fixed base.

24. The system of claim 14 further comprising: one or more bearing assemblies for slidably attaching the platen to the XY intermediate plate.

25. The system of claim 24 further comprising: an X axis linear actuator for controlling the X axis movement of the platen with respect to the XY intermediate plate.

* * * * *